C. A. HUBBARD.
SHOCK ABSORBER.
APPLICATION FILED JAN. 16, 1918.
1,278,350.
Patented Sept. 10, 1918.
2 SHEETS—SHEET 1.
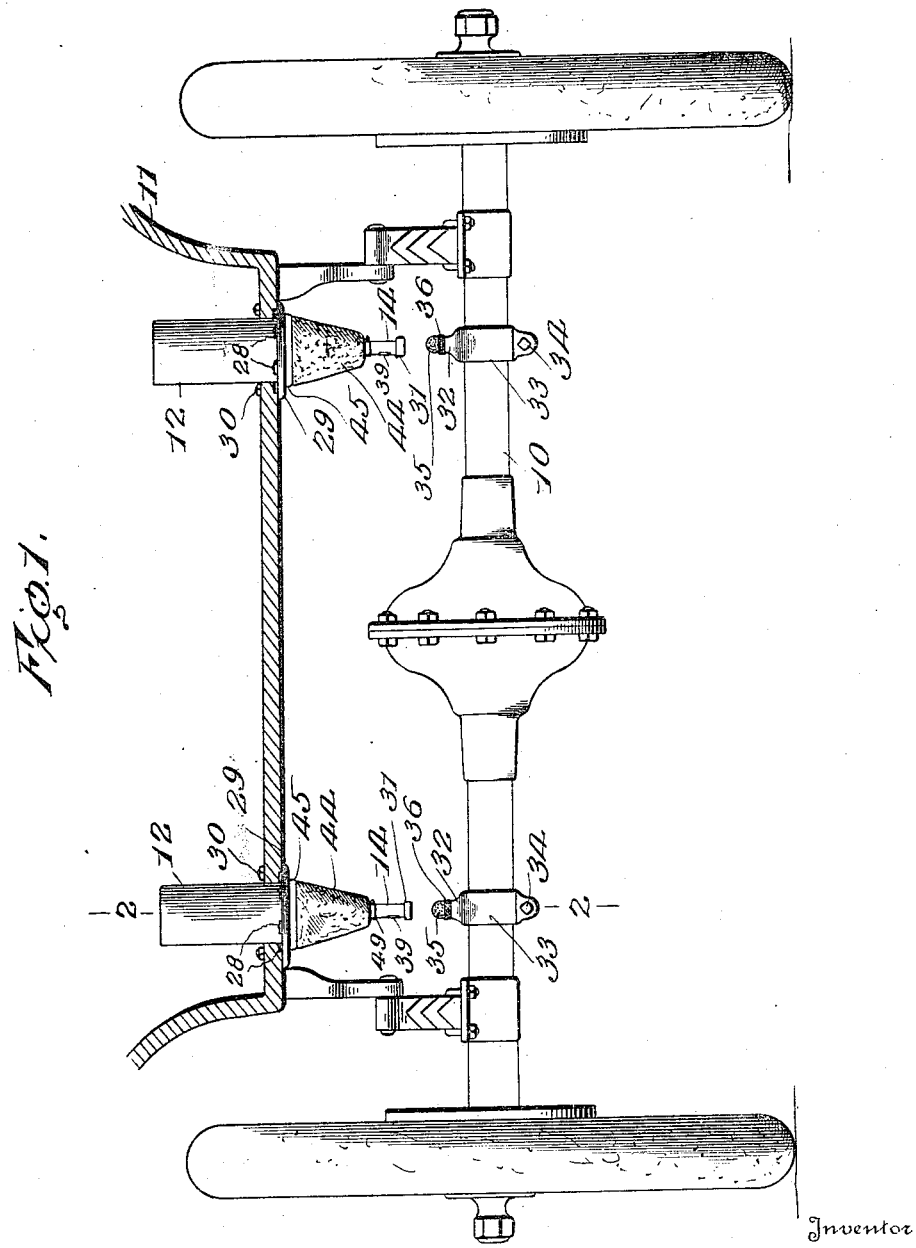
Inventor
C. A. Hubbard.
By [signature]
Attorneys.

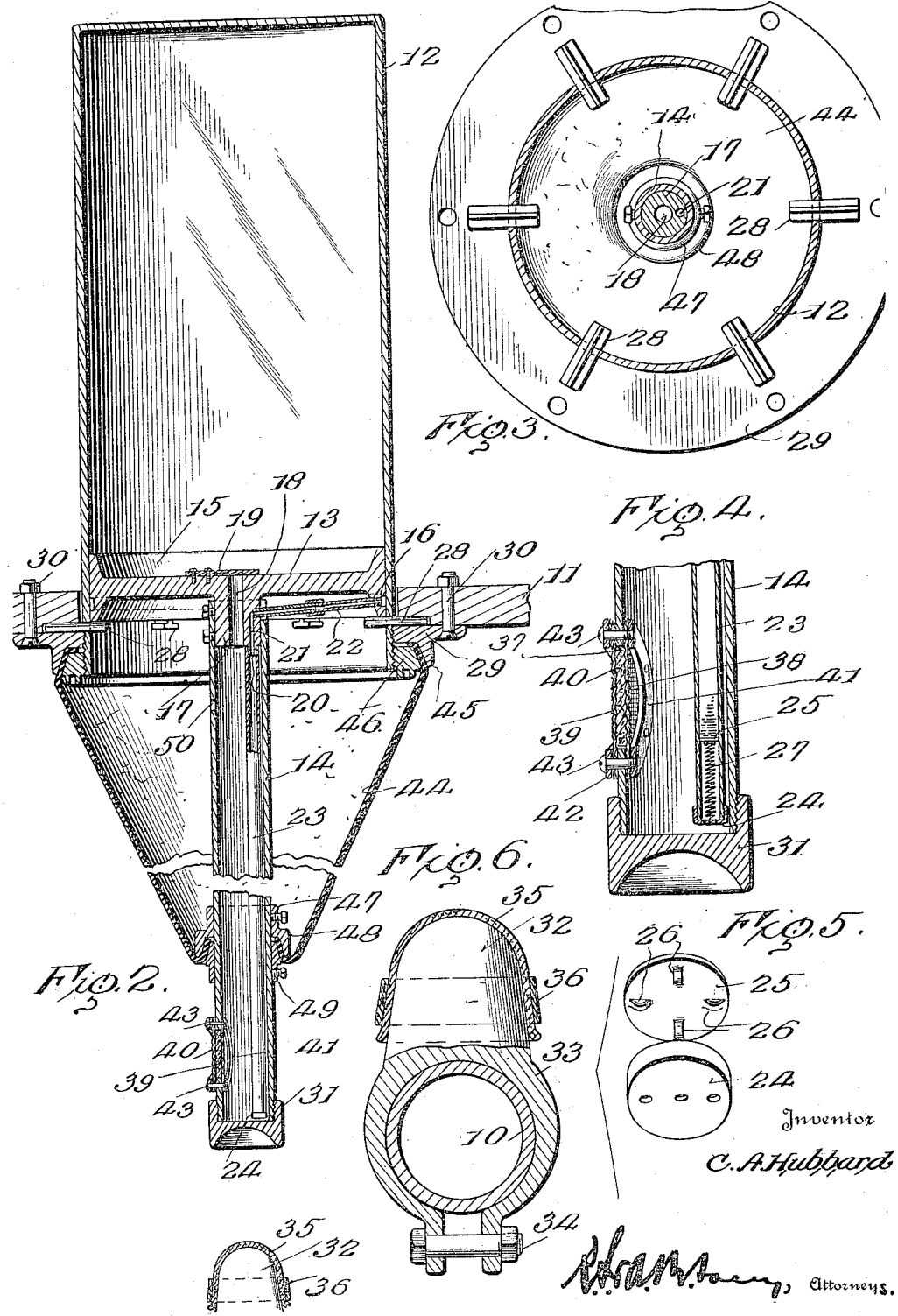

UNITED STATES PATENT OFFICE.

CECIL A. HUBBARD, OF ANN ARBOR, MICHIGAN.

SHOCK-ABSORBER.

1,278,350.   Specification of Letters Patent.   Patented Sept. 10, 1918.

Application filed January 16, 1918. Serial No. 212,020.

*To all whom it may concern:*

Be it known that I, CECIL A. HUBBARD, a citizen of the United States, residing at Ann Arbor, in the county of Washtenaw and State of Michigan, have invented certain new and useful Improvements in Shock-Absorbers, of which the following is a specification.

This invention relates to an improved shock absorber for motor vehicles and has as its primary object to provide a device of this character constructed to relieve jolting of the body of the vehicle by a cushion of air.

The invention has as a further object to provide a shock absorber particularly adapted for use at the rear of the vehicle body and employing a pneumatic cylinder having a plunger adapted to be projected into the cylinder for cushioning the vehicle body in its movement toward the rear axle upon the jolting of the vehicle.

The invention has as a still further object to provide a construction wherein the plunger will be effectually lubricated and wherein all dust and dirt will be prevented from gaining access within the pneumatic cylinder of the device.

And the invention has as a still further object to provide a shock absorber which may be readily mounted in position and which may be employed in connection with substantially any conventional type of motor vehicle.

Other and incidental objects will appear as the description proceeds, and in the drawings wherein I have illustrated the preferred embodiment of the invention, and wherein similar reference characters designate corresponding parts throughout the several views:

Figure 1 is a rear elevation showing a pair of my improved shock absorbers in position upon a conventional type of motor vehicle, the vehicle body being illustrated in section to show the mounting of the shock absorbers thereon.

Fig. 2 is a vertical sectional view taken on the line 2—2 of Fig. 1 and more particularly illustrating the details of construction of the shock absorber.

Fig. 3 is a transverse sectional view showing the stop pins employed for limiting the plunger of the device in its outward travel within the pneumatic cylinder employed.

Fig. 4 is a fragmentary sectional view showing the outer extremity of the plunger rod, and illustrating the dust screen employed at the air intake opening into the said rod.

Fig. 5 is a fragmentary perspective view of the follower and cap employed in connection with the lubricant receiving pipe of the device, and Fig. 6 is a detail sectional view showing the bumper employed to coact with the plunger rod.

In order that the construction, mounting and operation of my improved shock absorber may be accurately understood I have, in the drawings, shown the device in connection with a conventional type of motor vehicle having a rear axle 10 and body 11. As previously intimated, the improved shock absorber is particularly designed for use at the rear of the vehicle and, as shown in this figure, a pair of the said devices is mounted upon the body 11 adjacent opposite sides thereof and directly over the rear axle. Since the devices are identical in construction, only one will be described.

Referring now more particularly to Fig. 2 and subsequent figures of the drawings, a pneumatic cylinder 12 is employed. Mounted to reciprocate within this cylinder is a plunger or piston including a piston head 13 from which extends a piston rod 14. The piston head 13 is provided with a peripheral flange 15 to snugly engage the inner wall of the cylinder 12 and formed in this flange is an annular lubricant receiving groove 16 opening through the outer face of the flange. Projecting from one side of the piston head is an axial boss 17 and as will now be noted the piston rod 14 is hollow and is snugly fitted over this boss. Detachably connecting the piston rod with the boss are suitable set screws. The boss 17 is hollow to provide an intake passage 18 opening through the piston head and mounted upon the said piston head for closing the passage upon the upward movement of the piston is a suitable flap valve 19.

At one side of the passage 18 the outer extremity of the boss 17 of the piston head is formed with a nipple 20 from which leads a passage 21 through the boss. Communicating at one extremity with this passage is a pipe 22, the opposite extremity of which opens into the lubricant receiving groove of the piston head. Removably fitted within the piston rod 14 and screw threaded upon the nipple 20 is a lubricant reservoir pipe 23 terminating at its outer extremity adjacent the outer end of the piston rod and closed by a screw cap 24. Removably fitted in the outer extremity of the pipe 23, is a follower 25. This follower is, as shown in Fig. 5 of the drawings, formed with a plurality of upstruck lugs 26 through which is threaded the terminal convolution at one end of a spring 27 bearing at its opposite end against the cap 24. Thus, it will be seen that the pipe 23 may be unthreaded from the nipple 20 and removed from the piston rod 14, when the said pipe may then be filled with a suitable lubricant. Upon again connecting the pipe with the nipple, such lubricant will be supplied through the passage 21 and pipe 22 to the lubricant receiving groove 16 of the piston head for effectually lubricating the walls of the cylinder 12. A hard lubricant, such as a suitable lubricating grease, is preferably employed and it will be seen that the follower 25 will act to feed such lubricant into the lubricant receiving groove of the piston head. For increasing the tension of the spring 27 upon the said follower the cap 24 of the pipe 23, is, as shown in detail in Fig. 5, provided with suitable openings for receiving a spanner wrench whereby the said cap may be easily adjusted upon the pipe.

Detachably connecting the piston with the cylinder 12 are a plurality of radially disposed stop bars 28 fitted through the wall of the cylinder adjacent its lower extremity.

These stop bars are, as shown in Fig. 3, arranged at spaced points circumferentially about the cylinder and are wedged in suitable openings in the wall thereof, thus connecting the bars with the cylinder. The bars 28 are arranged in a common plane and at their inner extremities project into the cylinder for engagement with the piston head to limit the said piston head in its outward movement within the cylinder while the outer extremities of said bars project radially from the cylinder and serve to seat an attaching collar 29 therefor. This attaching collar is screw threaded upon the outer extremity of the cylinder to rest against the said bars and seats flat against the outer face of the floor of the body 11 of the vehicle, the floor, of course, being formed with a suitable opening for receiving the cylinder 12 projected upwardly through the floor. Engaging with the said collar are a plurality of bolts or other suitable fastening devices 30 detachably connecting the cylinder with the vehicle body. Screw threaded upon the outer terminal of the piston rod 14 is a closure cap 31 provided with a concave outer face and mounted upon the axle 10 of the vehicle to coöperate with the said cap is a bumper 32. This bumper is formed with coacting arms 33 which are formed to fit around the axle and at their outer extremities are adjustably connected by a bolt 34 for clamping the bumper upon the axle. The upper terminal of the bumper is rounded to engage within the concave face of the cap 31 and fitting over the said terminal is a preferably leather covering 35 held in position by a strap or other suitable flexible element 36. As particularly shown in Fig. 2, the lower end of the piston rod 14 is, when the vehicle body is disposed in normal position with respect to the rear axle of the vehicle, spaced above the bumper.

Formed through one side of the piston rod 14 adjacent its outer extremity is an air intake opening 37. Overlying this opening upon the inner side of the piston rod is a pair of superposed screens 38 and overlying the said opening upon the outer side of the piston rod is a similar pair of superposed screens 39. Disposed within the opening and retained between the pairs of screens is a filling of hair 40, forming a filter. Overlying the pair of screens 38 within the piston rod is an inner retaining ring 41. A similar outer retaining ring 42 is arranged to overlie the outer pair of screens 39 and connecting these retaining rings with each other as well as with the piston rod, are a plurality of bolts or other suitable fastening devices 43. It will thus be seen that the pairs of screens 38 and 39 will tend to prevent dust and dirt from entering the piston rod through the intake opening 37 while air flowing through said opening will be filtered through the hair filter 40 as well as through the said pairs of screens to effectually remove all dust and dirt from the air as it enters the piston rod.

Arranged over the lower end of the cylinder 12 and connected with the piston rod is a flexible split hood 44 for excluding dust or other foreign matter from the cylinder. This hood is preferably formed of leather, although heavy canvas may be employed, and is substantially cone-shaped, the large end of the hood receiving the lower end of the cylinder 12 while the smaller end of the hood is formed to fit around the piston rod. Formed on the attaching collar 29 for the cylinder is an annular inwardly beveled flange 45 for receiving the upper margin of the hood and screw threaded upon the lower end of the cylinder to engage within this flange is a binding ring 46 having an outer beveled face confronting the beveled face of the flange for tightly clamping the upper margin of the hood between the said ring and the flange. Connected with the piston rod adjacent the lower extremity of the hood is a collar 47 which is formed with an inwardly beveled annular flange 48. The lower margin of the hood is fitted within this flange and snugly engaging around the piston rod to coöperate with said flange is a beveled binding ring 49 held by a suitable set screw for clamping the lower margin of the hood between the said ring and the flange. The hood will thus be firmly secured at its extremities while, at the same time, the said hood may be easily removed should it be so desired. Formed through the piston rod at a point within the hood is a suitable vent opening 50 for the hood.

As will now be clear in view of the preceding description, the piston will normally gravitate within the cylinder 12 to the lower end of the said cylinder to be supported by the piston head 13 resting upon the stop bars 28. Upon the downward movement of the piston within the cylinder, air will be admitted through the intake opening 37 of the piston rod and through the passage 18 of the piston head into the said cylinder so that the piston will thus shift to its normal position. However, when the vehicle is passing over rough roads and the vehicle body is jolted downwardly toward the rear axle of the vehicle, the piston rod will be shifted to engage the bumper 32 when the piston will be moved upwardly within the cylinder 12. Upward movement of the piston will act to close the valve 19 thereof so that the air within the said cylinder will be retained therein and compressed by the piston for cushioning the vehicle in its downward movement. Severe jolting of the vehicle body will thus be eliminated.

It will, therefore, be seen that I have provided a very simple and efficient construction for the purpose set forth and while I have indicated that one of the improved devices is to be employed at each side of the vehicle body above the rear axle still, it will be readily understood that one of the improved devices may also be used at each side of the vehicle body above the front axle for cushioning the vehicle body at its forward extremity. I do not, therefore, wish to be limited in this regard.

Having thus described the invention, what is claimed as new is:

1. A shock absorber including a cushioning cylinder, a piston normally gravitating toward the lower extremity of the cylinder and including a piston head having a vent passage for the cylinder formed therethrough, and a hollow piston rod establishing communication between said passage and the outer air, the said piston rod being adapted to be engaged for shifting the piston upwardly within the cylinder, and a valve mounted upon the piston head to coöperate with said passage for closing the cylinder upon the upward movement of the piston.

2. A shock absorber including a cushioning cylinder, a piston mounted to gravitate toward the lower extremity of said cylinder and including a hollow piston rod communicating with the cylinder and having an intake opening formed therein for venting the cylinder, an air filter interposed in said opening, the piston rod being disposed to be engaged for shifting the piston upwardly within the cylinder, and means for closing communication between the piston rod and the cylinder upon the upward movement of the piston.

3. A shock absorber including a cushioning cylinder, a piston normally gravitating toward the lower extremity of the cylinder and including a hollow piston rod communicating with the cylinder and provided with an intake opening for venting the cylinder, screens connected with the piston rod to overlie said opening, an air filter interposed within the opening and retained by said screens, the piston rod being adapted to be engaged for shifting the piston upwardly within the said cylinder, and means for closing communication between the piston rod and the cylinder upon the upward movement of the piston.

4. A shock absorber including a cushioning cylinder open at its lower end, a piston normally gravitating toward the lower extremity of the said cylinder and including a piston rod disposed to be engaged for shifting the piston upwardly within the cylinder, the piston being formed with a passage for venting the cylinder upon the downward movement of the piston, means arranged to coöperate with said passage for closing the cylinder upon the upward movement of the piston, and a flexible hood fitting around the lower extremity of the cylinder and connected with the piston rod for closing the said cylinder at its open end.

5. A shock absorber including a cushioning cylinder open at its lower end, a piston gravitating toward the lower extremity of the cylinder and provided with a passage to vent the cylinder upon the downward movement of the piston, the said piston including a piston rod disposed to be engaged for shifting the piston upwardly within the cylinder, means arranged to coöperate with said passage for closing the cylinder upon the upward movement of the piston, an attaching collar carried by the cylinder for securing the said cylinder in position, and a flexible hood secured upon the said collar around the lower extremity of the cylinder and connected with the piston rod for closing the said cylinder at its open end.

6. A shock absorber including a cushioning cylinder, a piston normally gravitating toward the lower extremity of the cylinder and provided with a passage for venting the cylinder upon the downward movement of the piston, said piston including a piston rod disposed to be engaged for shifting the piston upwardly within the cylinder, means arranged to coöperate with said passage for closing the cylinder upon upward movement of the piston, stop members projected through the wall of the cylinder and adapted to engage the piston for limiting the piston in its downward movement, and an attaching collar for the cylinder mounted upon the lower extremity thereof to seat against the said stop members.

7. A shock absorber including a cushioning cylinder, a piston normally gravitating toward the lower extremity of the cylinder and provided with a passage for venting the cylinder upon downward movement of the piston, said piston including a piston rod, a bumper adapted to coöperate with the piston rod for shifting the piston upwardly within the cylinder, and means for closing said passage upon the upward movement of the piston.

8. A shock absorber including a cushioning cylinder, a piston normally gravitating toward the lower extremity of the said cylinder and including a piston head, and a hollow piston rod, a lubricant reservoir pipe mounted within the piston rod upon the piston head, the piston head being provided in its peripheral face with a lubricant receiving groove, means connecting the said pipe with the said groove, means closing the outer extremity of the piston rod and adapted to be engaged for shifting the piston upwardly within the cylinder, and means for venting the cylinder upon the downward movement of the piston and shiftable to close the cylinder upon the upward movement of the piston.

9. A shock absorber including a cushioning cylinder, a piston mounted to reciprocate within the said cylinder and including a hollow piston rod, and means for venting the cylinder to the outer air through the said rod upon movement of the piston within the cylinder in one direction and adapted to close the cylinder upon the movement of the piston in the opposite direction.

10. A shock absorber including a cushioning cylinder, a piston mounted to reciprocate within the said cylinder and including a hollow piston rod communicating with the cylinder and having an intake opening formed therein for venting the cylinder, screens overlying said opening upon the inner and outer sides of the piston rod, retaining rings overlying said screens, means connecting said rings and securing the screens in position, and means for closing communication between the piston rod and the cylinder upon movement of the piston within the cylinder in one direction.

11. A shock absorber including a cushioning cylinder open at one end, a piston mounted to reciprocate within the said cylinder and including a piston rod, means for venting the cylinder upon movement of the piston therein in one direction and adapted to close the cylinder upon movement of the piston in the opposite direction, an attaching collar carried by the cylinder, a flexible hood surrounding the open end of the cylinder, a clamping ring binding the said hood between the said ring and the collar for connecting the hood with the cylinder, and means connecting the hood with the said piston rod.

12. A shock absorber including a cushioning cylinder, a piston mounted to reciprocate therein and including a hollow piston rod, means for venting the cylinder through the said rod upon movement of the piston within the cylinder in one direction and adapted to close the said cylinder upon movement of the piston in the opposite direction, a lubricant reservoir mounted within the piston rod, and means establishing communication between the said reservoir and the peripheral face of the piston.

13. A shock absorber including a cushioning cylinder, a piston mounted to gravitate toward the lower end of said cylinder and including a piston rod, means for limiting the piston in its downward movement within the cylinder and adapted to suspend the piston from the said cylinder with the piston rod disposed to be engaged for shifting the piston upwardly within the cylinder, and means for venting the cylinder upon the downward movement of the piston and adapted to close the cylinder upon the upward movement of the piston.

14. A shock absorber including a cushioning cylinder having an open end, a piston mounted to reciprocate within the said cylinder, means for venting the cylinder upon movement of the piston therein in one direction and adapted to close the cylinder upon the movement of the piston within the said cylinder in the opposite direction, and a flexible hood closing the cylinder at its open end.

In testimony whereof I affix my signature.

CECIL A. HUBBARD. [L. S.]

Copies of this patent may be obtained for five cents each, by addressing the "Commissioner of Patents, Washington, D. C."